(12) United States Patent
Oi (10) Patent No.: US 9,427,674 B2
(45) Date of Patent: Aug. 30, 2016

(54) CLIP ATTACHMENT SYSTEM

(71) Applicant: Dickson Oi, Irvine, CA (US)

(72) Inventor: Dickson Oi, Irvine, CA (US)

( * ) Notice: Subject to any disclaimer, the term of this patent is extended or adjusted under 35 U.S.C. 154(b) by 0 days.

(21) Appl. No.: 14/694,991

(22) Filed: Apr. 23, 2015

(65) Prior Publication Data

US 2016/0016092 A1 Jan. 21, 2016

Related U.S. Application Data

(62) Division of application No. 14/290,897, filed on May 29, 2014, now abandoned.

(51) Int. Cl.
 *A63H 33/00* (2006.01)
 *F16B 2/22* (2006.01)

(52) U.S. Cl.
 CPC .................. *A63H 33/00* (2013.01); *F16B 2/22* (2013.01)

(58) Field of Classification Search
 CPC .................................. A63H 33/00; F16B 2/22
 See application file for complete search history.

(56) References Cited

U.S. PATENT DOCUMENTS

| | | | | |
|---|---|---|---|---|
| 1,575,089 A | * | 3/1926 | Bbcker | A63H 19/30 238/10 E |
| 1,601,572 A | | 9/1926 | Lester | |
| 3,521,332 A | * | 7/1970 | Kramer | F16B 2/22 248/229.26 |
| 4,575,038 A | * | 3/1986 | Moore | H05K 7/12 248/316.7 |
| 4,863,033 A | | 9/1989 | Buj | |
| 4,976,646 A | | 12/1990 | Hull | |
| 5,174,477 A | * | 12/1992 | Schafer | F41B 9/0009 141/18 |
| 5,730,405 A | | 3/1998 | Nichols, IV | |
| 5,823,483 A | | 10/1998 | Gaskill | |
| 6,202,963 B1 | * | 3/2001 | Derman | A46B 17/02 206/228 |
| 7,716,842 B2 | | 5/2010 | Sumner-Trivisani et al. | |
| 7,927,173 B1 | * | 4/2011 | Walterscheid | A63H 17/008 124/10 |
| 8,317,138 B1 | | 11/2012 | Johnson, Jr. | |
| 2006/0089077 A1 | | 4/2006 | Wittschen | |

(Continued)

FOREIGN PATENT DOCUMENTS

DE 19853578 A1 6/1999
DE 202008005539 U1 9/2008

(Continued)

OTHER PUBLICATIONS

Clip-on Silicone Spoon Holder, http://sporkcity.com/products/clip-on-silicone-spoon-holder/.

(Continued)

*Primary Examiner* — Robert J Sandy
*Assistant Examiner* — David Upchurch
(74) *Attorney, Agent, or Firm* — John D. Tran; Rhema Law Group (57) ABSTRACT

A clip attachment system and method of manufacture can include: a proximal end; a first prong and a second prong, the first prong and the second prong extending from sides of the proximal end; a proximal extension extending from a middle portion of the proximal end between and spaced apart from the first prong and the second prong, and the proximal extension extending further from the proximal end than all portions of the first prong and the second prong that are in direct contact with the proximal end; a first intermediate extension extending from the first prong toward the second prong and a second intermediate extension extending from the second prong toward the first prong; and wherein the first prong terminates in a first curved end that extends toward and is spaced apart from a second curved end of the second prong.

18 Claims, 6 Drawing Sheets

(56) References Cited

U.S. PATENT DOCUMENTS

| | | |
|---|---|---|
| 2006/0160458 A1 | 7/2006 | Peach |
| 2012/0152969 A1 | 6/2012 | Ates |

FOREIGN PATENT DOCUMENTS

| | | |
|---|---|---|
| JP | 2004261554 A | 9/2004 |
| WO | 2013104780 A1 | 7/2013 |

OTHER PUBLICATIONS

Bright Colors Silicone Utensil Clip, silicone spoon rest, Keep Utensil Handy for Stirring, Keep Stove and Counters Free of Drips, http://www.alibaba.com/product-detail/Bright-Colors-Silicone-Utensil-Clip-silicone_1571187699.html.

Silicone Pot Clip Spoon Rest Pan Spatula Holder Heat Resistant Kitchen Utensil, http://www.ebay.com/itm/Silicone-Pot-Clip-Spoon-Rest-Pan-Spatula-Holder-Heat-Resistant-Kitchen-Utensil-/350951138995.

Food grade silicone snug utensil holder & utensil rest clip, http://www.alibaba.conn/product-detail/food-grade-silicone-snug-utensil-holder_1456734613.html.

Computer Accessory, Colorful silicone cable clip, http://dgjijia.en.alibaba.conn/product/1400237865-219903554/Computer_Accessory_Colorful_silicone_cable_clip.html.

\* cited by examiner

CLIP ATTACHMENT SYSTEM

CROSS-REFERENCE TO RELATED APPLICATIONS

This is a Divisional of U.S. patent application Ser. No. 14/290,897 filed May 29, 2014 and claims priority benefit to all common subject matter. The content of this application is incorporated herein by reference.

TECHNICAL FIELD

This disclosure relates to clips for mechanical attachment, more particularly a clip for attaching to a utensil.

BACKGROUND

Utensils represent a large mature market in the United States. One area of the utensil market provides solutions for children while they are eating. Keeping a child entertained and sufficiently distracted while eating is an area of active product development and a point on which products are being effectively differentiated.

To compete successfully in this market a product must offer both high levels of functionality, and versatility, competitive cost, and ease of use. Many products on the market provide a toy permanently affixed to the end of a handle of a utensil. This development includes the disadvantage that when in use the toy is many times covered by the user's hand.

Another disadvantage of permanently affixing a toy to the end of a utensil is that the same utensil must be used whenever the child needs to interact with the toy. This requires the same utensil to be washed multiple times which can lead to deterioration of the utensil from frequent use and increased maintenance requirements with shorter maintenance periods.

Another disadvantage of having a toy permanently attached to the handle of a utensil is that the intersection between the toy and the utensil can create an area of food retention that is difficult to clean. This can lead to the growth and cultivation of harmful bacteria.

Solutions have been long sought but prior developments have not taught or suggested any complete solutions, and solutions to these problems have long eluded those skilled in the art. Thus there remains a considerable need for devices and methods that can provide a functional, versatile, low cost and easy to use attachment to a utensil.

SUMMARY

Contemplated embodiments of the clip attachment system can include systems and methods having a proximal end; a first prong and a second prong, the first prong and the second prong extending from sides of the proximal end; a proximal extension extending from a middle portion of the proximal end between and spaced apart from the first prong and the second prong, and the proximal extension extending further from the proximal end than all portions of the first prong and the second prong that are in direct contact with the proximal end; a first intermediate extension extending from the first prong toward the second prong and a second intermediate extension extending from the second prong toward the first prong; and wherein the first prong terminates in a first curved end that extends toward and is spaced apart from a second curved end of the second prong.

Accordingly it has been discovered that one or more embodiments described herein increase ease of manipulation while similarly increasing functionality, versatility. One or more embodiments described herein further provide a simple cost-effective solution for a non-permanent attachment.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The clip attachment system is illustrated in the figures of the accompanying drawings which are meant to be exemplary and not limiting, in which like reference numerals are intended to refer to like components, and in which.

DETAILED DESCRIPTION

In the following description, reference is made to the accompanying drawings that form a part hereof, and in which are shown by way of illustration, embodiments in which the clip attachment system may be practiced. It is to be understood that other embodiments may be utilized and structural changes may be made without departing from the scope of the clip attachment system.

The clip attachment system is described in sufficient detail to enable those skilled in the art to make and use the clip attachment system and provide numerous specific details to give a thorough understanding of the clip attachment system; however, it will be apparent that the clip attachment system may be practiced without these specific details.

In order to avoid obscuring the clip attachment system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the clip attachment system can be operated in any orientation.

For expository purposes, the term "horizontal" as used herein is defined as a plane parallel to the top plane or surface of the clip, regardless of its orientation. The term "vertical" refers to a direction perpendicular to the horizontal as just defined. Terms, such as "above", "below", "bottom", "top", "side", "higher", "lower", "upper", "over", and "under", are defined with respect to the horizontal plane. The terms defined in this paragraph should be understood to encompass reasonable engineering tolerances.

Figure 1:
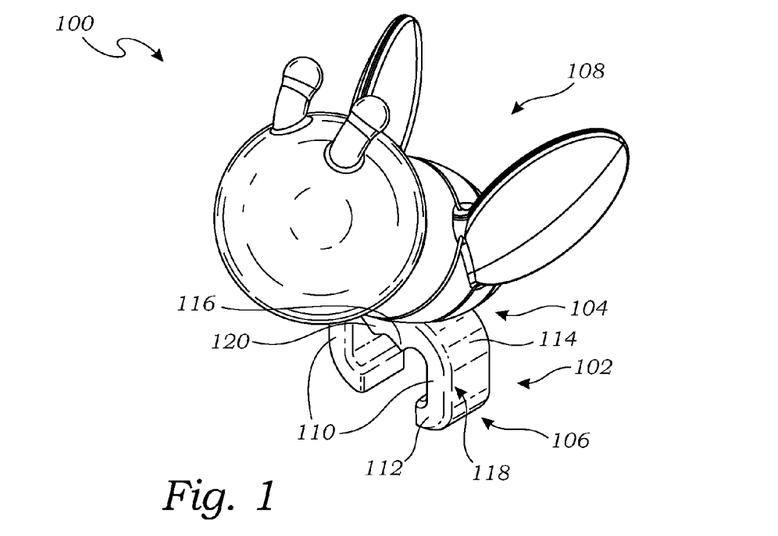
FIG. 1 is an isometric view of the clip attachment system in a first embodiment.

Referring now to FIG. 1, therein is shown an isometric view of the clip attachment system 100 in a first embodiment. The clip attachment system 100 is shown having a clip 102 having a proximal end 104 and a distal end 106.

Attached to the clip 102 is a toy 108. The toy 108 is attached to the clip 102 near the proximal end 104 of the clip 102. The toy 108 is depicted as a flying insect such as a honey bee. It is contemplated that the toy 108 can be any number of shapes and sizes including airplanes, birds, cars, trains, domesticated animals, African animals, fictional characters from cartoons or books, and other suitable forms. It is further contemplated that the clip 102 could instead attach a name tag or other identifying indicia to an item or utensil.

The distal end 106 of the clip 102 is depicted extending away from the proximal end 104 of the clip 102 with prongs 110. The prongs 110 extend downward away from the toy 108 and then terminate in curved ends 112.

The curved ends 112 curve in toward each other and toward one of the prongs 110 opposite each of the curved ends 112. The curved ends 112 curve the prongs 110 toward each other by almost 90 degrees. The prongs 110 are shown extending directly from the proximal end 104 having vertical outer surfaces and each of the prongs 110 have a single smooth curved surface. The curved surfaces of the prongs 110 are depicted curving from the vertical outer surfaces and terminating in vertical edges. The vertical edges can be parallel to the vertical outer surfaces. The curved surfaces are shown extending from the vertical outer surfaces toward the vertical edges and the vertical edges are spaced apart.

The prongs 110 are depicted as extending vertically down; however it is contemplated that the prongs 110 can be manufactured to extend down in a curved fashion similar to that depicted in the second embodiment of FIG. 5, below. The prongs 110 are connected to the proximal end 104 of the clip 102 with shoulders 114. The shoulders 114 curve down and away from a middle portion 116 of the proximal end 104.

The shoulders 114 connect the proximal end 104 to the prongs 110 on sides 118 of the clip 102. The side 118 are depicted as flat. It is contemplated that the side 118 can include curved surfaces and other suitable shapes as well.

Near the middle portion 116 of the proximal end 104 the clip 102 includes proximal extensions 120. The proximal extensions 120 extend down away from the proximal end 104 near the middle portion 116 toward the distal end 106.

It has been discovered that the proximal extensions 120 and the curved ends 112 of the clip 102 enable the clip attachment system 100 to be mechanically attached to many various utensils. The proximal extensions 120 and the curved ends 112 advantageously position the various utensils within the clip 102 and maintain appropriate friction with the various utensils providing increased structural rigidity and proper placement of the toy 108 in relation to various utensils enabling a user to easily manipulate various utensils when the clip attachment system 100 is attached.

The proximal extensions 120 are depicted as two downward extending v-shaped proximal extensions 120. The curved ends 112 are shown terminating near the distal end 106. The curved ends 112 are positioned apart from each other and do not touch each other.

It is contemplated that the clip 102 and the toy 108 can be manufactured of a soft elastic child safe material like silicone. It has been discovered that utilizing the clip 102 fashioned with the proximal extensions 120 and curved ends 112 coupling the clip 102 to various utensils greatly reduces the complexity of the clip 102 required for a suitable connection.

Figure 2:
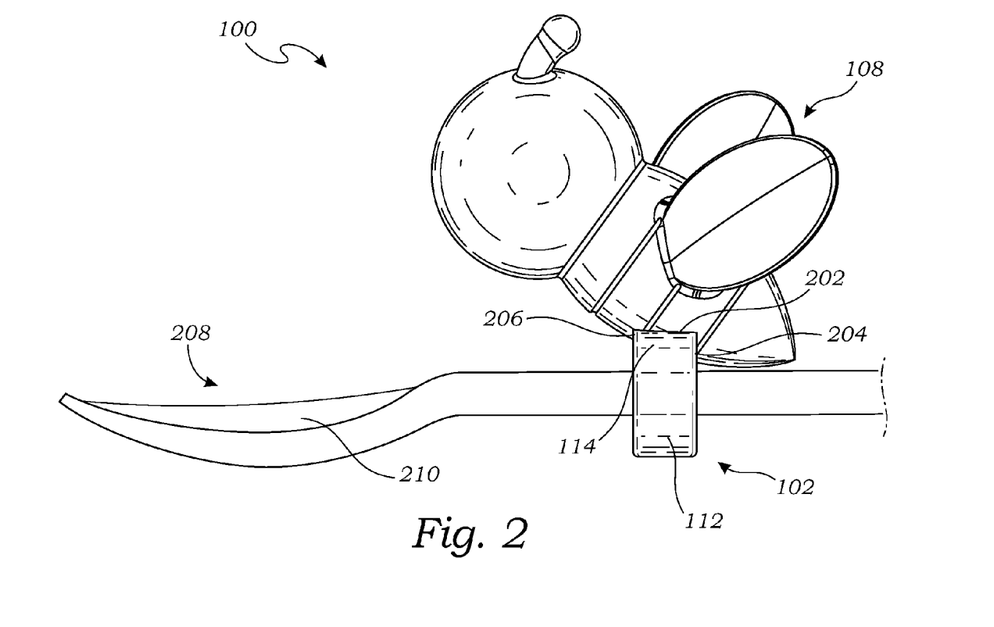
FIG. 2 is a side view of the clip attachment system of FIG. 1 in an attachment phase of operation.

Referring now to FIG. 2, therein is shown a side view of the clip attachment system 100 of FIG. 1 in an attachment phase of operation. The clip attachment system 100 is shown having the toy 108 attached to the clip 102 near the proximal end 104.

The toy 108 is attached to a top side 202 and a back side 204 of the proximal end 104. The toy 108 is further attached to only a portion of a front side 206 of the proximal end 104.

It has been discovered that attaching the toy 108 to the top side 202, the back side 204, and only a portion of the front side 206 provides the benefit of increasing the structural rigidity of the bond between the toy 108 and the clip 102 and simultaneously angles the toy into a pleasing position to be seen and interacted with by users of a utensil 208 the clip 102 is attached to.

The utensil 208 is depicted extending from the back side 204 through the clip 102 to the front side 206. The utensil 208 is depicted extending level with the prongs 110 extending around the utensil 208. The utensil 208 is further depicted surrounded by the shoulders 114 and the curved ends 112 of the clip 102.

The clip attachment system 100 can be positioned close to the operational end 210 of the utensil 208 to ensure that a user can grip and manipulate the utensil 208 naturally without having to awkwardly grasp the utensil 208 or reposition their hand. Further the clip attachment system 100 is position on the utensil 208 so that the view of the toy 108 is unobstructed to a user eating off the operational end 210 of the utensil 208.

Figure 3:
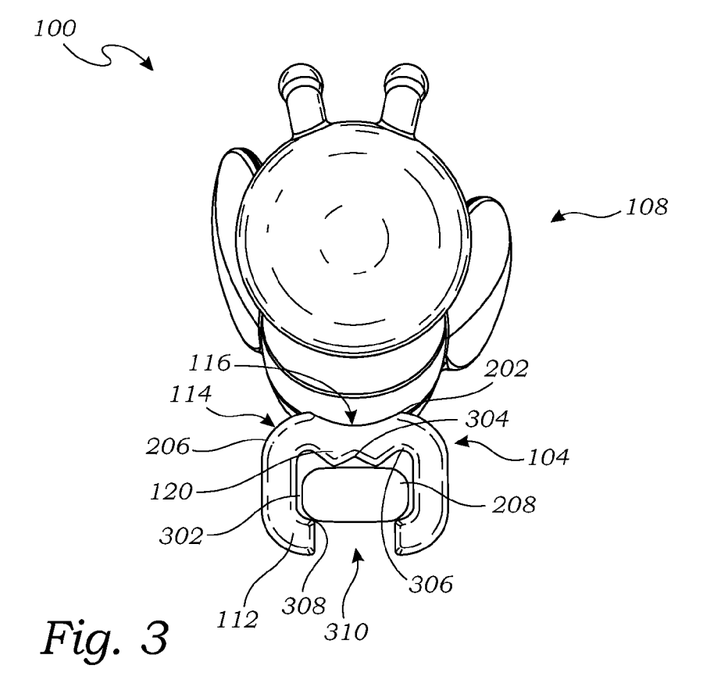
FIG. 3 is a front view of the clip attachment system of FIG. 2.

Referring now to FIG. 3, therein is shown a front view of the clip attachment system 100 of FIG. 2. The clip attachment system 100 is shown having the toy 108 coupled to the clip 102 on the top side 202 and only a portion of the front side 206.

The utensil 208 is shown within the clip 102 sandwiched between the proximal extensions 120 and the curved ends 112. The utensil 208 is positioned with clearance 302 around the entire utensil 208 with the exception of the portions of the utensil 208 in contact with the curved ends 112 and the proximal extensions 120.

The proximal extensions 120 enable the utensil 208 to be securely mounted within the clip 102 without contacting the middle portion 116 of the proximal end 104. The proximal extensions 120 are depicted as a w-shape with a center upward peak 304 disposed lower than outer terminal portions 306 of the proximal extensions 120 where the proximal extensions 120 terminate near the shoulders 114 and the proximal end 104.

The utensil 208 contacts the curved ends 112 near top corners 308 of the curved ends 112. The top corners 308 contact the utensil 208 either underneath the utensil 208 or on corners of the utensil 208. The toy 108 is shown not extending into an area coplanar with the proximal extensions 120 but remains above the plane of the proximal extensions 120 of the clip 102. This ensures that the toy 108 never interferes with the coupling between the clip 102 and the utensil 208.

The curved ends 112 are shown having a gap 310 therebetween. The gap 310 is depicted as narrower than the width of the utensil 208. The utensil 208 can be placed within the clip 102 by moving the prongs 110 outward during mounting and allowing them to return to their pre-mounting position closing the curved ends 112 in around the utensil 208.

The utensil 208 is shown contacting the proximal extensions 120 near lower portions of the proximal extensions 120 closest to the utensil 208 but the utensil 208 does not contact the center upward peak 304 or the proximal end 104 near the shoulders 114 of the clip 102. The proximal extensions 120 can be formed of an elastic, soft, child friendly material such as silicon or other suitable materials to enable the proximal extensions 120 to deform as the utensil 208 is pressed into the proximal extensions 120 by the contact of the curved ends 112 with the utensil 208.

Figure 4:
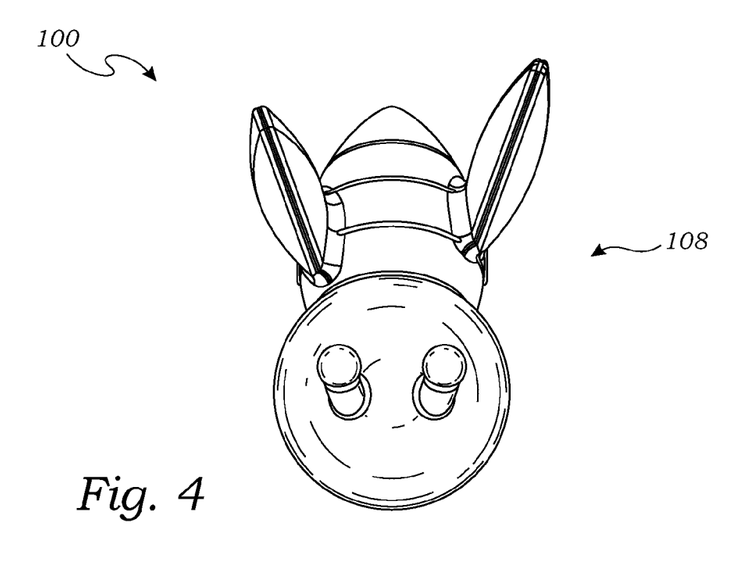
FIG. 4 is an isometric view of the clip attachment system of FIG. 1.

Referring now to FIG. 4, therein is shown an isometric view of the clip attachment system 100 of FIG. 1. The clip attachment system 100 is shown with the toy 108 in an asymmetrical configuration. It is contemplated that the toy 108 can be configured to stimulate children at different ages, genders, dispositions, and interests.

Figure 5:
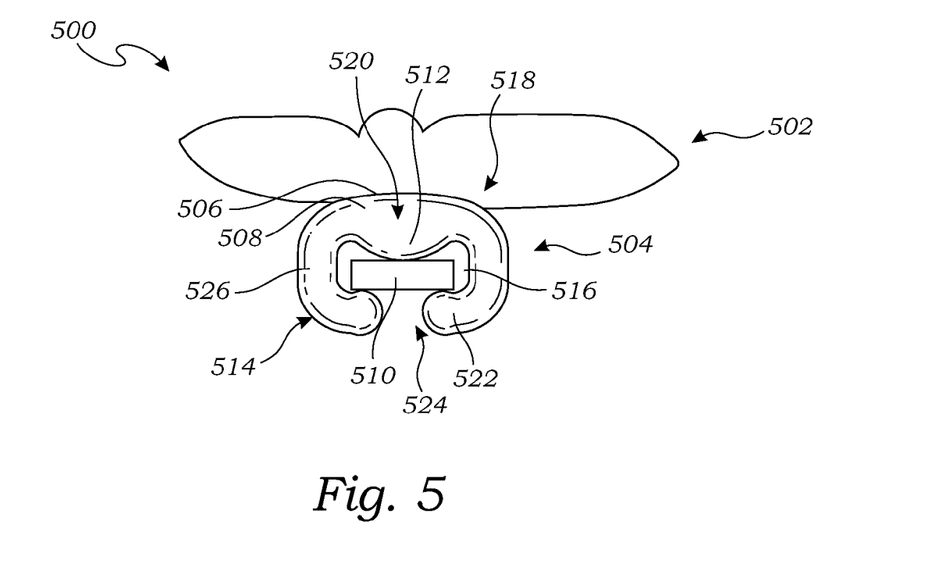
FIG. 5 is a front view of the clip attachment system in a second embodiment.

Referring now to FIG. 5, therein is shown a front view of the clip attachment system 500 in a second embodiment. The clip attachment system 500 is shown having a toy 502 coupled to a clip 504 on a top side 506 and only a portion of a front side 508.

A utensil 510 is shown within the clip 504 sandwiched between a proximal extension 512 and curved ends 514. The utensil 510 is positioned with clearance 516 around the entire utensil 510 with the exception of the portions of the utensil 510 in contact with the curved ends 514 and the proximal extension 512.

The proximal extension 512 enables the utensil 510 to be securely mounted within the clip 504 without contacting a middle portion 516 of a proximal end 518. The proximal extension 512 is depicted as a u-shape extending down from the middle portion 520 of the proximal end 518.

The utensil 510 contacts the curved ends 514 near upward curving bulbous tips 522 of the curved ends 514. The upward curving bulbous tips 522 have a larger cross-sectional area than the curved ends 514 and contact the utensil 510 above the curved ends 514.

The upward curving bulbous tips 522 contact the utensil 510 either underneath the utensil 510 or on corners of the utensil 510. The toy 502 is shown not extending into an area coplanar with the proximal extension 512 but remains above the plane of the proximal extension 512 of the clip 504. This ensures that the toy 502 never interferes with the coupling between the clip 504 and the utensil 510.

The curved ends 514 are shown having a gap 524 therebetween. The gap 524 is depicted as narrower than the width of the utensil 510. The utensil 510 can be placed within the clip 504 by moving prongs 526 outward during mounting and allowing them to return to their pre-mounting position closing the curved ends 514 in around the utensil 510.

The utensil 510 is shown contacting the proximal extension 512 near a lower portion of the proximal extension 512 closest to the utensil 510 but the utensil 510 does not contact the center upward peak 304 or the proximal end 104 near the shoulders 114 of the clip 504. The proximal extension 512 can be formed of an elastic, soft, child friendly material such as silicon or other suitable materials to enable the proximal extension 512 to deform as the utensil 510 is pressed into the proximal extension 512 by the contact of the curved ends 514 with the utensil 510. The prongs 526 are depicted extending downward from the proximal end 518 in a curved configuration.

Figure 6:
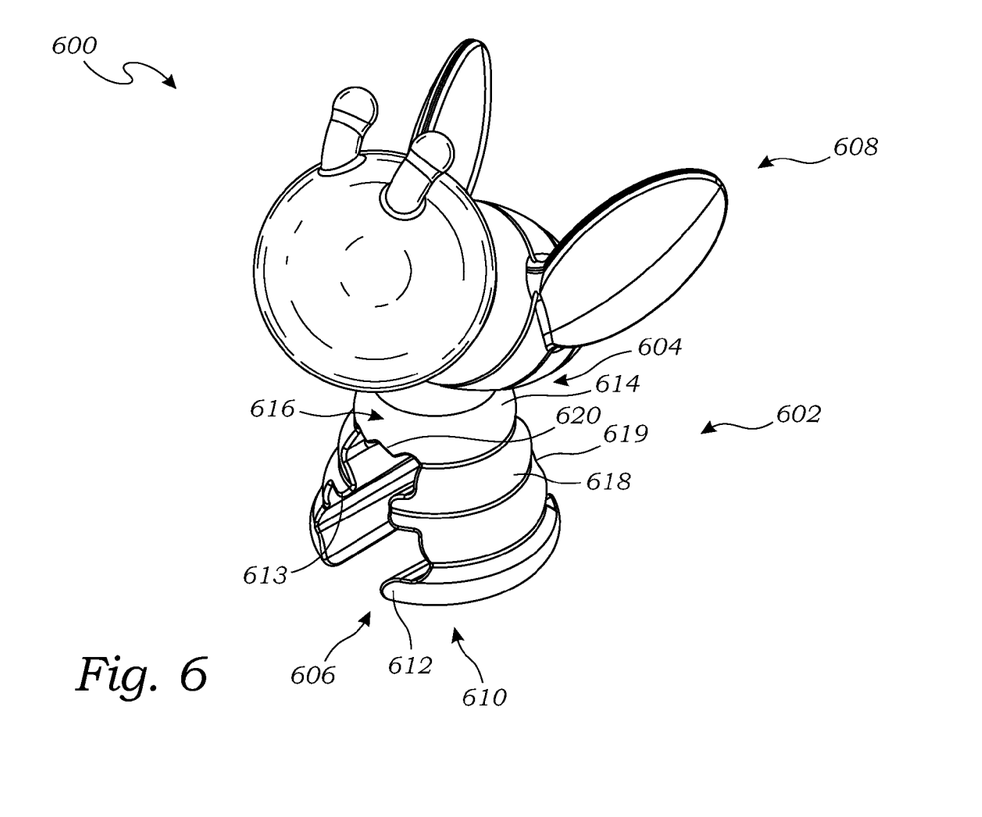
FIG. 6 is an isometric view of the clip attachment system in a third embodiment.

Referring now to FIG. 6, therein is shown an isometric view of the clip attachment system 600 in a third embodiment. The clip attachment system 600 is shown having a clip 602 having a proximal end 604 and a distal end 606.

Attached to the clip 602 is a toy 608. The toy 608 is attached to the clip 602 near the proximal end 604 of the clip 602. The toy 608 is depicted as a flying insect such as a honey bee. It is contemplated that the toy 608 can be any number of shapes and sizes including airplanes, birds, cars, trains, domesticated animals, African animals, fictional characters from cartoons or books, and other suitable forms. It is further contemplated that the clip 602 could instead attach a name tag or other identifying indicia to an item or utensil.

The distal end 606 of the clip 602 is depicted extending away from the proximal end 604 of the clip 602 with prongs 610. The prongs 610 extend downward away from the toy 608 and then terminate in curved ends 612.

The curved ends 612 curve in toward each other and toward one of the prongs 610 opposite each of the curved ends 612. The curved ends 612 curve the prongs 610 toward each other by more than 90 degrees from a straight extension of the prongs 610.

Extending from the prongs 610 parallel to the curved ends 612 are intermediate extensions 613. The intermediate extensions 613 can create two distinct cavities between the prongs 610.

The prongs 610 are depicted as extending vertically down and angling away from each other so that the prongs 610 taper toward the proximal end 604. The prongs 610 are connected to the proximal end 604 of the clip 602 with shoulders 614. The shoulders 614 curve down and away from a middle portion 616 of the proximal end 604.

The shoulders 614 connect the proximal end 604 to the prongs 610 on sides 618 of the clip 602. The side 618 are depicted as terraced with increasingly smaller grooves 619 as the grooves are located closer to the proximal end 604 of the clip 602. The grooves 619 circumscribe the prongs 610 of the clip 602 horizontally providing a stepped appearance to the outer surface of the prongs 610.

Near the middle portion 616 of the proximal end 604 the clip 602 includes proximal extensions 620. The proximal extensions 620 extend down away from the proximal end 604 near the middle portion 616 toward the distal end 606.

It has been discovered that the proximal extensions 620 along with the intermediate extensions 613 and the curved ends 612 of the clip 602 enable the clip attachment system 600 to be mechanically attached to many various utensils. The proximal extensions 620, the intermediate extensions 613, and the curved ends 612 advantageously position the various utensil within the clip 602 and maintain appropriate friction with the various utensils providing increased structural rigidity and proper placement of the toy 608 in relation to various utensils enabling a user to easily manipulate various utensils when the clip attachment system 600 is attached. It is contemplated that the proximal extensions 120 in combination with the intermediate extensions 613 can be used to couple the clip 102 to metal objects or utensils, while the intermediate extensions 613 in combination with the curved ends 112 can be used to couple the clip 102 to plastic objects or utensils.

The proximal extensions 620 are depicted as two downward extending v-shaped proximal extensions 620. The curved ends 612 are shown terminating near the distal end 606. The curved ends 612 are positioned apart from each other and do not touch each other. The intermediate extensions 613 are shown extending less than midway between the proximal end 604 and the distal end 606. The intermediate extensions 613 are positioned apart from each other and do not touch each other.

It is contemplated that the clip 602 and the toy 608 can be manufactured of a soft elastic child safe material like silicone. It has been discovered that utilizing the clip 602 fashioned with the proximal extensions 620 and curved ends 612 coupling the clip 602 to various utensils greatly reduces the complexity of the clip 602 required for a suitable connection.

Figure 7:
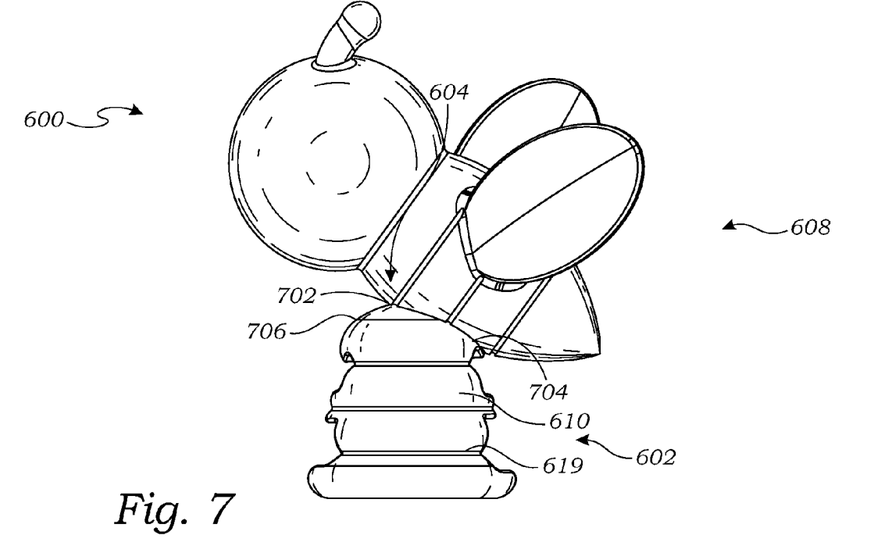
FIG. 7 is a side view of the clip attachment system of FIG. 6.

Referring now to FIG. 7, therein is shown a side view of the clip attachment system 600 of FIG. 6. The clip attachment system 600 is shown having the toy 608 attached to the clip 602 near the proximal end 604.

The toy 608 is attached to a top side 702 and a back side 704 of the clip 102. The toy 608 is not attached to the front side 706 of the proximal end 604.

It has been discovered that attaching the toy 608 to the top side 702, the back side 704, and none of the front side 706 provides the benefit of increasing the structural rigidity of the bond between the toy 608 and the clip 602 and simultaneously angles the toy into a pleasing position to be seen and interacted with by users of a utensil (not shown) the clip 602 is attached to.

The prongs 610 extending down from the proximal end 604 are shown having the grooves 619 extending from the front side 702 to the back side 204 around the prongs 610. The grooves 619 are of different widths than the prongs 610.

Figure 8:
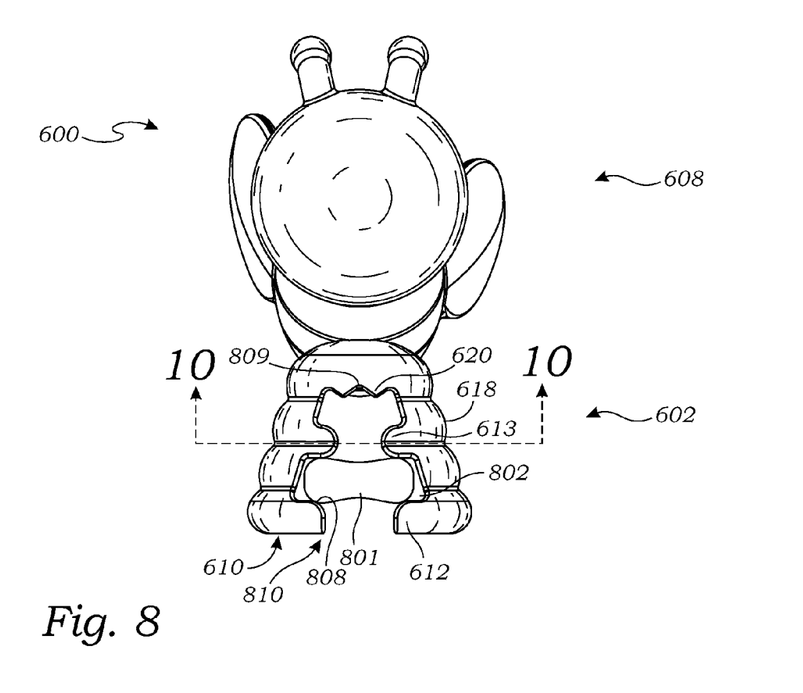
FIG. 8 is a front view of the clip attachment system of FIG. 6 in an attachment phase of operation.

Referring now to FIG. 8, therein is shown a front view of the clip attachment system 600 of FIG. 6. The clip attachment system 600 is shown having the toy 608 coupled to the clip 602 on the top side 702.

A utensil 801 is shown within the clip 602 sandwiched between the intermediate extensions 613 and the curved ends 612. The utensil 801 is positioned with clearance 802 around the entire utensil 801 with the exception of the portions of the utensil 801 in contact with the curved ends 612 and the intermediate extensions 613.

The intermediate extensions 613 enable the utensil 801 to be securely mounted within the clip 602 without contacting the side 618 of the clip 602. The intermediate extensions 613 are depicted as a u-shaped angled by ninety degrees.

The utensil 801 contacts the curved ends 612 near top corners 808 of the curved ends 612. The top corners 808 contact the utensil 801 either underneath the utensil 801 or on corners of the utensil 801. The toy 608 is shown partially extending into an area coplanar with the proximal extensions 620 and below a center upward peak 809. This allows minimal contact of the toy 608 with the utensil 801.

The curved ends 612 are shown having a gap 810 therebetween. The gap 810 is depicted as narrower than the width of the utensil 801. The utensil 801 can be placed within the clip 602 by moving the prongs 610 outward during mounting and allowing them to return to their pre-mounting position closing the curved ends 612 in around the utensil 801.

The utensil 801 is shown contacting the intermediate extensions 613 near lower portions of the intermediate extensions 613 closest to the utensil 801 but the utensil 801 does not contact the side 618 of the clip 602. The proximal extensions 620 can be formed of an elastic, soft, child friendly material such as silicon or other suitable materials to enable the intermediate extensions 613 and the curved ends 612 to deform as the utensil 801 is pressed into the intermediate extensions 613 by the contact of the curved ends 612 with the utensil 801.

Figure 9:
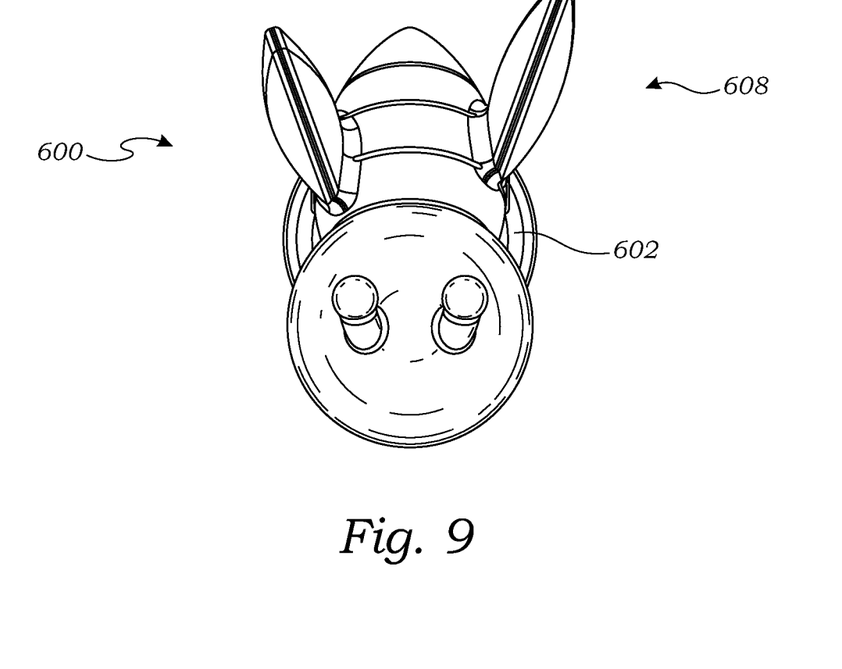
FIG. 9 is an isometric view of the clip attachment system of FIG. 6.

Referring now to FIG. 9, therein is shown an isometric view of the clip attachment system 600 of FIG. 6. The clip attachment system 600 is shown with the toy 608 in an asymmetrical configuration. It is contemplated that the toy 608 can be configured to stimulate children at different ages, genders, dispositions, and interests. The clip 602 is further shown extending out away from the toy 608 and peripheral to the toy 608.

Figure 10:
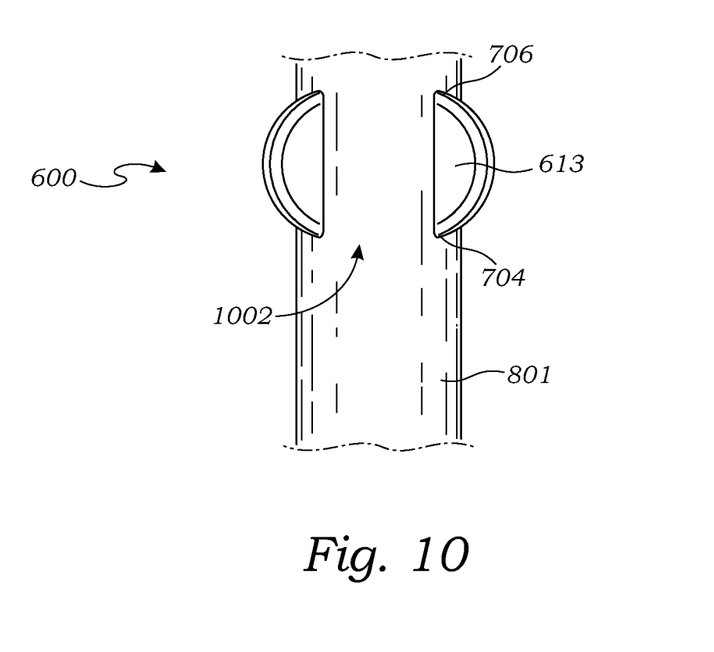
FIG. 10 is a cross-sectional view of the clip attachment system of FIG. 8 along the line 10-10.

Referring now to FIG. 10, therein is shown a cross-sectional view of the clip attachment system of FIG. 8 along the line 10-10. The clip attachment system 600 is shown having the utensil 801 between a gap 1002 between the intermediate extensions 613.

The intermediate extensions 613 are shown with the gap 1002 having a greater width near the back side 704 than a width near the front side 706. It is contemplated that the change in width can also be a feature of the curved ends 612 of FIG. 6. It has been discovered that tapering the width from the back side 704 to the front side 706 increases material contact with the utensil 801 and provides a better grip for a user.

Figure 11:
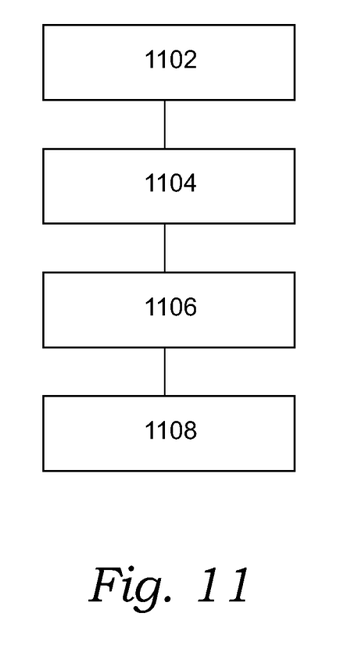
FIG. 11 is a flowchart for manufacturing the clip attachment system.

Referring now to FIG. 11, therein is shown a flowchart for manufacturing the clip attachment system. The flowchart can include forming a proximal end in a block 1102; forming a first prong and a second prong, the first prong and the second prong extending from sides of the proximal end wherein forming the first prong includes forming the first prong terminating in a first curved end that extends toward and is spaced apart from a second curved end of the second prong in a block 1104; forming a proximal extension extending from a middle portion of the proximal end between and spaced apart from the first prong and the second prong, and the proximal extension extending further from the proximal end than all portions of the first prong and the second prong that are in direct contact with the proximal end in a block 1106; and forming a first intermediate extension and a second intermediate extension, the first intermediate extension extending from the first prong toward the second prong and the second intermediate extension extending from the second prong toward the first prong in a block 1108.

Thus, it has been discovered that the clip attachment system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the clip attachment system has been described in conjunction with a specific best mode, it is to be understood that many alternatives, modifications, and variations will be apparent to those skilled in the art in light of the preceding description.

Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:
1. A clip attachment system comprising:
a proximal end;
a first prong and a second prong, wherein the first prong and the second prong extends from sides of the proximal end, angling away from each other and tapering toward the proximal end, and the first prong and the second prong having terraced grooves circumscribing and forming a stepped appearance to an outer surface of the first prong and the second prong;
a proximal extension extending from a middle portion of the proximal end between and spaced apart from the first prong and the second prong;
a first intermediate extension extending from the first prong toward the second prong and a second intermediate extension extending from the second prong toward the first prong; and
wherein the first prong terminates in a first curved end that extends toward and is spaced apart from a second curved end of the second prong.

2. The system of claim 1 further comprising a toy attached to a top side of the proximal end.

3. The system of claim 1 further comprising a second proximal extension next extending from the middle portion of the proximal end between and spaced apart from the first prong and the second prong.

4. The system of claim 1 wherein the proximal end, the first prong, the second prong, the proximal extension, or a combination thereof are colored for identifying an item attached to the clip attachment system.

5. The system of claim 1 wherein the proximal extension is formed from a soft elastic material.

6. The system of claim 1 further comprising a utensil between the first prong and the second prong.

7. The system of claim 1 wherein the first curved end has a bulbous shape with a portion of the first curved end closer to the proximal end than all surrounding portions of the first curved end.

8. The system of claim 1 wherein the first prong is spaced further from the second prong near the first curved end than near the portion of the first prong in direct contact with the proximal end.

9. The system of claim 1 wherein the first curved end terminates outside of an area defined by a vertical extension of a perimeter of the proximal extension.

10. A method of manufacturing a clip attachment system comprising:
forming a proximal end;
forming a first prong and a second prong, wherein the first prong and the second prong extends from sides of the proximal end, angling away from each other and tapering toward the proximal end, and forming the first prong and the second prong having terraced grooves circumscribing and forming a stepped appearance to an outer surface of the first prong and the second prong;
forming a proximal extension extending from a middle portion of the proximal end between and spaced apart from the first prong and the second prong;
forming a first intermediate extension extending from the first prong toward the second prong;
forming a second intermediate extension extending from the second prong toward the first prong; and wherein forming the first prong includes forming the first prong terminating in a first curved end that extends toward and is spaced apart from a second curved end of the second prong.

11. The method of claim 10 further comprising forming a toy attached to a top side of the proximal end.

12. The method of claim 10 further comprising forming a second proximal extension next extending from the middle portion of the proximal end between and spaced apart from the first prong and the second prong.

13. The method of claim 10 wherein forming the proximal end, the first prong, the second prong, or the proximal extension, includes coloring the proximal end, the first prong, the second prong, the proximal extension or a combination thereof for identifying an item attached to the clip attachment method.

14. The method of claim 10 wherein forming the proximal extension includes forming the proximal extension from a soft elastic material.

15. The method of claim 10 further comprising attaching a utensil between the first prong and the second prong.

16. The method of claim 10 wherein forming the first prong includes forming the first prong terminating in a first curved end having a bulbous shape with a portion of the first curved end closer to the proximal end than all surrounding portions of the first curved end.

17. The method of claim 10 wherein forming the first prong and the second prong includes forming the first prong spaced further from the second prong near the first curved end than near the portion of the first prong in direct contact with the proximal end.

18. The method of claim 10 wherein forming the first prong includes forming the first prong terminating in a first curved end terminating outside of an area defined by a vertical extension of a perimeter of the proximal extension.

* * * * *